(12) United States Patent
Kuramoto et al.

(10) Patent No.: US 11,422,401 B2
(45) Date of Patent: Aug. 23, 2022

(54) LIGHT DIFFUSION FILM COMPRISING AN INDENTATION ELASTIC MODULUS OF 30 MPA OR MORE AT 23 DEGREES CELSIUS THROUGHOUT AN ENTIRETY OF THE LIGHT DIFFUSION FILM

(71) Applicant: LINTEC CORPORATION, Tokyo (JP)

(72) Inventors: Tatsuki Kuramoto, Tokyo (JP); Kentaro Kusama, Tokyo (JP); Baku Katagiri, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 16/798,520

(22) Filed: Feb. 24, 2020

(65) Prior Publication Data
US 2020/0271833 A1    Aug. 27, 2020

(30) Foreign Application Priority Data

Feb. 26, 2019  (JP) .............................. JP2019-032413

(51) Int. Cl.
*G02F 1/1335* (2006.01)
*G02B 5/02* (2006.01)

(52) U.S. Cl.
CPC ....... *G02F 1/133504* (2013.01); *G02B 5/021* (2013.01); *G02B 5/0268* (2013.01); *G02B 5/0278* (2013.01)

(58) Field of Classification Search
CPC .... G02B 5/021; G02B 5/0268; G02B 5/0236; G02B 6/0025
See application file for complete search history.

(56) References Cited

U.S. PATENT DOCUMENTS

2006/0290253 A1* 12/2006 Yeo ..................... G02B 5/0231
                                                              313/116
2017/0293054 A1* 10/2017 Kusama ............... G02B 5/0278
2017/0363803 A1* 12/2017 Nakamori ............ G02B 6/0088

FOREIGN PATENT DOCUMENTS

JP    2005326774 A  * 11/2005
JP    2017170671 A  *  9/2017
JP        6414883       10/2018
KR   20110043881 A  *  4/2011

* cited by examiner

*Primary Examiner* — Paul C Lee
(74) *Attorney, Agent, or Firm* — Greenblum & Bernstein, P.L.C.

(57) ABSTRACT

A light diffusion film having an internal structure in the film. The internal structure includes a plurality of regions having a relatively high refractive index in a region having a relatively low refractive index. The light diffusion film has an indentation elastic modulus of 30 MPa or more at 23° C.

6 Claims, 1 Drawing Sheet

LIGHT DIFFUSION FILM COMPRISING AN INDENTATION ELASTIC MODULUS OF 30 MPA OR MORE AT 23 DEGREES CELSIUS THROUGHOUT AN ENTIRETY OF THE LIGHT DIFFUSION FILM

TECHNICAL FIELD

The present invention relates to a light diffusion film that can diffuse or transmit the incident light depending on the incident angle.

BACKGROUND ART

In the technical field of optics to which optical devices such as liquid crystal display devices and organic light-emitting devices belong, the use of a light diffusion film is studied. When light in a specific direction is incident on the light diffusion film, it can strongly diffuse the incident light in a specific direction.

An example of such a light diffusion film has an internal structure in the film. The internal structure includes a plurality of regions having a relatively high refractive index in a region having a relatively low refractive index. More specifically, an existing light diffusion film has a louver structure in which a plurality of plate-like regions having different refractive indices is alternately arranged along one arbitrary direction along the film surface. Another existing light diffusion film has a column structure in which a plurality of columnar bodies having a relatively high refractive index is densely arranged to stand in a region having relatively low refractive index.

Patent Document 1 discloses a light diffusion film as described above, which is obtained by curing a resin composition for light diffusion films. The resin composition contains a predetermined urethane (meth acrylate compound, a predetermined (meth)acrylic ester compound having an aromatic skeleton, and a predetermined photopolymerization initiator.

PRIOR ART DOCUMENTS

Patent Documents

[Patent Document 1] JP6414883B

SUMMARY OF THE INVENTION

Problems to be Solved by the Invention

Conventional light diffusion films have a problem in that dents are likely to occur when the film is manufactured and/or collapse is likely to occur when the film is laminated on another member. If such dents and/or collapse occur, an optical device such as a liquid crystal display device manufactured using the light diffusion film cannot exhibit desired performance.

The present invention has been made in consideration of such actual circumstances and an object of the present invention is to provide a light diffusion film in which occurrence of dents and/or collapse is suppressed.

Means for Solving the Problems

To achieve the above object, first, the present invention provides a light diffusion film having an internal structure in the film, the internal structure comprising a plurality of regions having a relatively high refractive index in a region having a relatively low refractive index, the light diffusion film having an indentation elastic modulus of 30 Mpa or more at 23° C. (Invention 1).

The light diffusion film according to the above invention (Invention 1) has an indentation elastic modulus within the above-described range at 23° C. thereby to well suppress the occurrence of dents when the film is manufactured and/or the occurrence of collapse when the film is laminated on another member.

In the above invention (Invention 1), the light diffusion film may preferably have an indentation elastic modulus of 500 MPa or less at 23° C. (Invention 2).

In the above invention (Invention 1, 2), the light diffusion film may preferably have a tensile elastic modulus of 1 MPa or more and 500 MPa or less at 23° C. (Invention 3).

In the above invention (Invention 1 to 3), the internal structure in the light diffusion film may preferably be an internal structure in which the plurality of regions having the relatively high refractive index extends with a predetermined length in a film thickness direction in the region having the relatively low refractive index (Invention 4).

Advantageous Effect of the Invention

In the light diffusion film according to the present invention, dents and/or collapse are less likely to occur.

EMBODIMENTS FOR CARRYING OUT THE INVENTION

Hereinafter, one or more embodiments of the present invention will be described.

The light diffusion film according to an embodiment of the present invention has an internal structure in the film. The internal structure includes a plurality of regions having a relatively high refractive index in a region having a relatively low refractive index.

1. Physical Properties and Other Properties of Light Diffusion Film (1) Indentation Elastic Modulus The indentation elastic modulus at 23° C. of the light diffusion film according to the present embodiment, is 30 MPa or more. This allows the light diffusion film according to the present embodiment to have moderate elasticity while achieving good light diffusivity. Accordingly, the occurrence of dents during the manufacturing is suppressed, and the occurrence of collapse is also suppressed even when the film is laminated on another member. From this viewpoint, the indentation elastic modulus at 23° C. of the light diffusion film may be preferably 50 MPa or more and particularly preferably 100 MPa or more.

The upper limit of the indentation elastic modulus at 23° C. of the light diffusion film is not particularly limited, but may be preferably 5,000 MPa or less, particularly preferably 1,000 MPa or less, and further preferably 300 MPa or less from the viewpoint of readily achieving good light diffusivity. Details of a method of measuring the above indentation elastic modulus are as described in the testing example, which will be described later.

(2) Tensile Elastic Modulus

The tensile elastic modulus at 23° C. of the light diffusion film according to the present embodiment may be preferably 1 MPa or more, particularly preferably 5 MPa or more, and further preferably 10 MPa or more. From another aspect, the above tensile elastic modulus may be preferably 500 MPa or less, particularly preferably 100 MPa or less, and further preferably 50 MPa or less. When the tensile elastic modulus falls within such ranges, the indentation elastic modulus at 23° C. of the light diffusion film can be easily adjusted into the above-described ranges. Details of a method of measuring the above tensile elastic modulus are as described in the testing example, which will be described later.

(3) Thickness

The thickness of the light diffusion film according to the present embodiment may be preferably 20 μm or more, particularly preferably 50 μm or more, and further preferably 80 μm or more as the lower limit. When the lower limit of the thickness of the light diffusion film falls within the above range, the light diffusion film may readily exhibit desired light diffusivity. From another aspect, the thickness of the light diffusion film may be preferably 700 μm or less, particularly preferably 400 μm or less, and further preferably 200 μm or less as the upper limit. When the upper limit of the thickness of the light diffusion film falls within the above range, the ratio of the internal structure forming region in the thickness direction can be increased, and the light diffusion film can have more excellent optical characteristics.

(4) Variable Haze Angle Range

When the inner structure in the light diffusion film is a column structure, which will be described later, the angle range (variable haze angle range) of an incident angle that gives a haze value equal to or more than a threshold may be preferably 20° or more, particularly preferably 30° or more, and further preferably 38° or more.

The threshold is set to 90% of the maximum haze value measured when one surface of the diffusion film is irradiated with light rays at an incident angle of −50° to 10° with respect to the normal direction of the surface being 0°. When the above variable haze angle range is 20° or more, the angle range of incident light that can achieve good light diffusivity is wider. The upper limit of the above variable haze angle range is not particularly limited and may be, for example, 60° or less in an embodiment, 55° or less in a particular embodiment, and 50° or less in a further embodiment.

When the inner structure in the light diffusion film is a louver structure, which will be described later, the angle range (variable haze angle range) of an incident angle that gives a haze value equal to or more than a threshold may be preferably 10° or more, particularly preferably 15° or more, and further preferably 20° or more. The threshold is set to 30% of the maximum haze value measured when one surface of the diffusion film is irradiated with light rays at an incident angle of −50° to 10° with respect to the normal direction of the surface being 0°. When the above variable haze angle range is 10° or more, the angle range of incident light that can achieve good light diffusivity is wider. The upper limit of the above variable haze angle range is not particularly limited and may be, for example, 50° or less in an embodiment, 40° or less in a particular embodiment, and 30° or less in a further embodiment.

Details of a method of measuring the above-described variable haze angle range are as described in the testing example, which will be described later.

2. Configuration of Light Diffusion Film

The material for constituting the light diffusion film according to the present embodiment is not particularly limited, provided that the light diffusion film satisfies the physical properties relating to the above-described indentation elastic modulus. For example, the light diffusion film according to the present embodiment may be a film obtained by curing a composition for light diffusion films that contains a high refractive index component and a low refractive index component having a lower refractive index than that of the high refractive index component.

In particular, from the viewpoint of easily adjusting the indentation elastic modulus at 23° C. into the above-described range, the light diffusion film according to the present embodiment may preferably be a film obtained by curing a composition for light diffusion films that contains a high refractive index component having one or two polymerizable functional groups, a low refractive index component having a lower refractive index than that of the high refractive index component and having one or two polymerizable functional groups, and a polyfunctional monomer having three or more polymerizable functional groups. Such a composition for light diffusion films will be described in more detail below.

(1) Composition for Light Diffusion Films (1-1) High Refractive Index Component

When the above composition for light diffusion films contains a high refractive index component having one or two polymerizable functional groups, the light diffusion film may readily form an internal structure that includes, as previously described, a plurality of regions having a relatively high refractive index in a region having a relatively low refractive index. This allows the obtained light diffusion film to readily exhibit desired light diffusivity. Furthermore, the obtained light diffusion film may readily satisfy the physical properties relating to the above-described indentation elastic modulus.

The above high refractive index component is not particularly limited, provided that it has one or two polymerizable functional groups and the obtained light diffusion film can exhibit desired light diffusivity. Preferred examples of the high refractive index component include (meth)acrylic ester that contains an aromatic ring, and (meth)acrylic ester that contains a plurality of aromatic rings may be particularly preferred. In the present specification, (meth)acrylic acid means both the acrylic acid and the methacrylic acid. The same applies to other similar terms.

Examples of the above-described (meth)acrylic ester that contains a plurality of aromatic rings include those in which a part thereof is substituted with halogen, alkyl, alkoxy, alkyl halide, or the like, such as biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, and benzylphenyloxyalkyl (meth)acrylate.

The above-described (meth)acrylic ester that contains a plurality of aromatic rings may be preferably a compound that contains a biphenyl ring and particularly preferably a biphenyl compound represented by the following general formula (1). When the composition for light diffusion films contains the biphenyl compound represented by the general formula (1) as the high refractive index component, at the time of curing the composition for light diffusion films, a difference in the polymerization rate may readily occur between the high refractive index component and the low refractive index, and the compatibility between the high refractive index component and the low refractive index component may readily decrease. This can effectively reduce the copolymerizability between the two components, and as a result, the previously described internal structure is formed better. Moreover, the refractive index of the high refractive index regions derived from the high refractive index component may readily be increased, and the difference from the refractive index of the low refractive index region can be easily adjusted to a desired value.

[Chemical Formula 1]

(1)

(In the above general formula (1), $R^1$ to $R^{10}$ are each independent, and one or two of $R^1$ to $R^{10}$ are substituents represented by the following general formula (2) while the others are each a substituent of any of a hydrogen atom, a hydroxyl group, a carboxyl group, an alkyl group, an alkoxy group, a halogenated alkyl group, a hydroxyalkyl group, a carboxyalkyl group, and a halogen atom.)

[Chemical Formula 2]

(2)

(In the above general formula (2), $R^{11}$ is a hydrogen atom or a methyl group, the carbon number n is an integer of 1 to 4, and the repeat number m is an integer of 1 to 10.)

Preferred examples of the biphenyl compound represented by the above-described general formula (1) include a compound (o-phenylphenoxyethyl acrylate) represented by the following general formula (3) and a compound (o-phenylphenoxyethoxyethyl acrylate) represented by the following general formula (4).

[Chemical Formula 3]

(3)

[Chemical Formula 4]

(4)

The weight-average molecular weight of the high refractive index component in the present embodiment may be preferably 2,500 or less, particularly preferably 1,500 or less, and further preferably 1,000 or less as the upper limit. When the upper limit of the weight-average molecular weight of the high refractive index component falls within the above range, a difference may readily occur between the weight-average molecular weight of the high refractive index component and the weight-average molecular weight of the low refractive index component, so that a difference may also readily occur between the polymerization rate of the high refractive index component and the polymerization rate of the low refractive index component. As a result, a light diffusion film having a desired internal structure may readily be formed.

From another aspect, the weight-average molecular weight of the high refractive index component in the present embodiment may be preferably 150 or more, particularly preferably 200 or more, and further preferably 250 or more as the lower limit. When the lower limit of the weight-average molecular weight of the high refractive index component falls within the above range, a high refractive index may readily be achieved, and the high refractive index component may readily have a desired polymerization rate. As a result, a difference may readily occur between the polymerization rate of the high refractive index component and the polymerization rate of the low refractive index component, and a light diffusion film having a desired internal structure may readily be formed.

As used in the present specification, the weight-average molecular weight refers to a value that is measured as a standard polystyrene equivalent value using the gel permeation chromatography (GPC) method.

The refractive index of the high refractive index component in the present embodiment may be preferably 1.45 or more, more preferably 1.50 or more, particularly preferably 1.54 or more, and further preferably 1.56 or more as the lower limit. When the lower limit of the refractive index of the high refractive index component falls within the above range, a desired refractive index difference may readily be achieved between the region having a relatively low refractive index and the regions having a relatively high refractive index which are formed in the light diffusion film.

From another aspect, the refractive index of the high refractive index component in the present embodiment may be preferably 1.70 or less, particularly preferably 1.65 or less, and further preferably 1.59 or less as the upper limit. When the upper limit of the refractive index of the high refractive index component falls within the above range, an unduly reduced compatibility between the high refractive index component and the low refractive index component can be suppressed, and a desired light diffusion film may readily be formed.

The above-described refractive index of the high refractive index component means a refractive index of the high refractive index component before curing the composition for light diffusion films, and the refractive index is measured in accordance with JIS K0062: 1992.

The content of the high refractive index component in the composition for light diffusion films may be preferably 25 mass parts or more, particularly preferably 40 mass parts or more, and further preferably 50 mass parts or more with respect to 100 mass parts of the low refractive index component. From another aspect, the content of the high refractive index component in the composition for light diffusion films may be preferably 400 mass parts or less, particularly preferably 300 mass parts or less, and further preferably 200 mass parts or less with respect to 100 mass parts of the low refractive index component. When the content of the high, refractive index component falls within such ranges, the regions derived from the high refractive index component and the region derived from the low refractive index component exist with a desired ratio in the internal structure formed in the light diffusion film, and as a result, the light diffusion film may readily achieve desired light diffusivity.

(1-2) Low Refractive Index Component

When the composition for light diffusion films contains a low refractive index component having a refractive index lower than that of the high, refractive index component and having one or two polymerizable functional groups, the light diffusion film may readily form an internal structure that includes, as previously described, a plurality of regions having a relatively high refractive index in a region having a relatively low refractive index. This allows the obtained light diffusion film to readily exhibit desired light diffusivity. Furthermore, the obtained light diffusion film may readily satisfy the physical properties relating to the above-described indentation elastic modulus.

The above low refractive index component is not particularly limited, provided that it has a refractive index lower than that of the high refractive index component and has one or two polymerizable functional groups and the obtained light diffusion film can exhibit desired light diffusivity. Preferred examples of the above low refractive index component include urethane (meth)acrylate, a (meth)acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may be preferably formed of (a) a compound that contains at least two isocyanate groups, (b) polyalkylene glycol, and (c) hydroxyalkyl (meth)acrylate.

Preferred examples of the above-described (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above-described (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 or more, particularly preferably 4,300 or more, and further preferably 6,300 or more. From another aspect, the weight-average molecular weight of the (b) polyalkylene glycol may be preferably 19,500 or less, particularly preferably 14,300 or less, and further preferably 12,300 or less. When the weight-average molecular weight of the (b) polyalkylene glycol falls within the above range, the weight-average molecular weight of the low refractive-index component can be easily adjusted into a certain range, which will be described later.

Preferred examples of the above-described (c) hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. Among these, 2-hydroxyethyl methacrylate may be preferably used from the viewpoint of reducing the polymerization rate of the obtained urethane (meth)acrylate and more efficiently forming a predetermined internal structure.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably a ratio of 1-5:1:1-5, particularly preferably a ratio of 1-3:1:1-3, and further preferably a ratio of 2:1:2.

The weight-average molecular weight of the low refractive index component in the present embodiment may be preferably 3,000 or more, particularly preferably 5,000 or more, and further preferably 7,000 or more as the lower limit. When the lower limit of the weight-average molecular weight of the low refractive index component falls within the above range, a difference may readily occur between the weight-average molecular weight of the high refractive index component and the weight-average molecular weight of the low refractive index component, so that a difference may also readily occur between the polymerization rate of the high refractive index component and the polymerization rate of the low refractive index component. As a result, a light diffusion film having a desired internal structure may readily be formed.

From another aspect, the weight-average molecular weight of the low refractive index component in the present embodiment may be preferably 20,000 or less, particularly preferably 15,000 or less, and further preferably 13,000 or less as the upper limit. When the upper limit of the weight-average molecular weight of the low refractive index component falls within the above range, an unduly reduced compatibility between the high refractive index component and the low refractive index component can be suppressed, and precipitation or the like of the high refractive index component can be effectively suppressed at the stage of applying the composition for light diffusion films to a process sheet.

The refractive index of the low refractive index component in the present embodiment may be preferably 1.59 or less, more preferably 1.50 or less, particularly preferably 1.49 or less, and further preferably 1.48 or less as the upper limit. When the upper limit of the refractive index of the low refractive index component falls within the above range, the region having a relatively low refractive index and the regions having a relatively high refractive index can be formed in the light diffusion film in a state of having a desired refractive index difference.

From another aspect, the refractive index of the low refractive index component in the present embodiment may be preferably 1.30 or more, particularly preferably 1.40 or more, and particularly preferably 1.46 or more as the lower limit. When the lower limit of the refractive index of the low refractive index component falls within the above range, an unduly reduced compatibility between the high refractive index component and the low refractive index component can be suppressed, and a desired light diffusion film may readily be formed.

The above-described refractive index of the low refractive index component means a refractive index of the low refractive index component before curing the composition for light diffusion films, and the refractive index is measured in accordance with JIS K0062: 1992.

In the present embodiment, the refractive index difference between the high refractive index component and the low refractive index component may be preferably 0.01 or more, particularly preferably 0.05 or more, and further preferably 0.1 or more. When the refractive index difference falls within the above range, the formed light diffusion film may readily achieve desired light diffusivity. On the other hand, from the viewpoint of adjusting the compatibility between the high refractive index component and the low refractive index component into an appropriate range, the refractive index difference between these components may be preferably 0.5 or less and particularly preferably 0.2 or less.

(1-3) Multifunctional Monomer

When the composition for light diffusion films contains a polyfunctional monomer having 3 or more polymerizable functional groups with the content to be described later, the obtained light diffusion film may readily satisfy the physical properties relating to the above-described indentation elastic modulus.

The above polyfunctional monomer is not particularly limited, provided that it has three or more polymerizable functional groups, and polyfunctional (meth)acrylate may be particularly preferably used. Examples of such polyfunctional (meth)acrylate having three or more polymerizable functional groups include trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, pentaerythritol tetra(meth)acrylate, tris(acryloxyethyl) isocyanurate, propionic acid-modified dipentaerythritol penta(meth)acrylate, dipentaerythritol hexa(meth)acrylate, and caprolactone-modified dipentaerythritol hexa(meth)acrylate. These may each be used alone, or two or more types may also be used in combination. Among the above-described polyfunctional (meth)acrylates, at least one of trimethylolpropane tri(meth)acrylate, dipentaerythritol tri(meth)acrylate, and pentaerythritol tetra(meth)acrylate may be preferably used.

The content of the polyfunctional monomer in the composition for light diffusion films may be preferably 0.1 mass parts or more, particularly preferably 1 mass part or more, and further preferably 4 mass parts or more with respect to 100 mass parts of the total amount of the high refractive index component and the low refractive index component. From another aspect, the above content may be preferably 14 mass parts or less, particularly preferably 10 mass parts or less, and further preferably 8 mass parts or less with respect to 100 mass parts of the total amount of the high refractive index component and the low refractive index component. When the content of the polyfunctional monomer falls within such ranges, the obtained light diffusion film can more readily satisfy the physical properties relating to the above-described indentation elastic modulus.

(1-4) Others

The composition for light diffusion films may contain other additives in addition to the previously described components to such an extent that the effects of the present invention are not impaired. Examples of other additives include a photopolymerization initiator, an antioxidant, an ultraviolet absorber, an antistatic, a polymerization accelerator, a polymerization inhibitor, an infrared absorber, a plasticizer, a diluting solvent, and a leveling agent.

Among the above, a photopolymerization initiator may preferably be contained in the composition for light diffusion films. When the composition for light diffusion films contains a photopolymerization initiator, a light diffusion film having a desired internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl]propane]. These may each be used alone, or two or more types may also be used in combination.

When the photopolymerization initiator is used, the content of the photopolymerization initiator in the composition for light diffusion films may be preferably 0.2 mass parts or more, particularly preferably 0.5 mass parts or more, and further preferably 1 mass part or more with respect to 100 mass parts of the total amount of the high refractive index component and the low refractive index component. From another aspect, the content of the photopolymerization initiator may be preferably 20 mass parts or less, particularly preferably 15 mass parts or less, and further preferably 10 mass parts or less with respect to 100 mass parts of the total amount of the high refractive index component and the low refractive index component. When the content of the photopolymerization initiator in the composition for light diffusion films falls within the above range, the light diffusion film can be readily and efficiently formed.

(1-5) Preparation of Composition for Light Diffusion Films

The composition for light diffusion films can be prepared by uniformly mixing the previously described high refractive index component, low refractive index component, and multifunctional monomer and, if desired, other additives such as a photopolymerization initiator.

In the above mixing, a uniform composition for light diffusion films may be obtained by stirring it while heating it to a temperature of 40° C. to 80° C. A dilution solvent may be added and mixed so that the obtained composition for light diffusion films has a desired viscosity.

(2) Internal Structure

The internal structure of the light diffusion film according to the present embodiment will then be described in more detail. The light diffusion film according to the present embodiment has an internal structure that includes a plurality of regions having a relatively high refractive index in a region having a relatively low refractive index. More specifically, the light diffusion film according to the present embodiment may have an internal structure in which a plurality of regions having a relatively high refractive index extends with a predetermined length in the film thickness direction in a region having a relatively low refractive index. Thus, the internal structure as referred to herein may have a feature that the regions having a relatively high refractive index extend in the film thickness direction, and this feature is distinguished from those of a phase-separation structure in which one phases exist in the other phase without clear regularity and a sea-island structure in which approximately spherical island components exist in a sea component.

An example of the internal structure in the present embodiment may be a column structure in which a plurality of columnar bodies having a relatively high refractive index is densely arranged to stand in a region having a relatively low refractive index. Another example of the above-described internal structure may be a louver structure in which a plurality of plate-like regions having different refractive indices is alternately arranged along one arbitrary direction along the film surface.

(2-1) Column Structure

Figure 1:
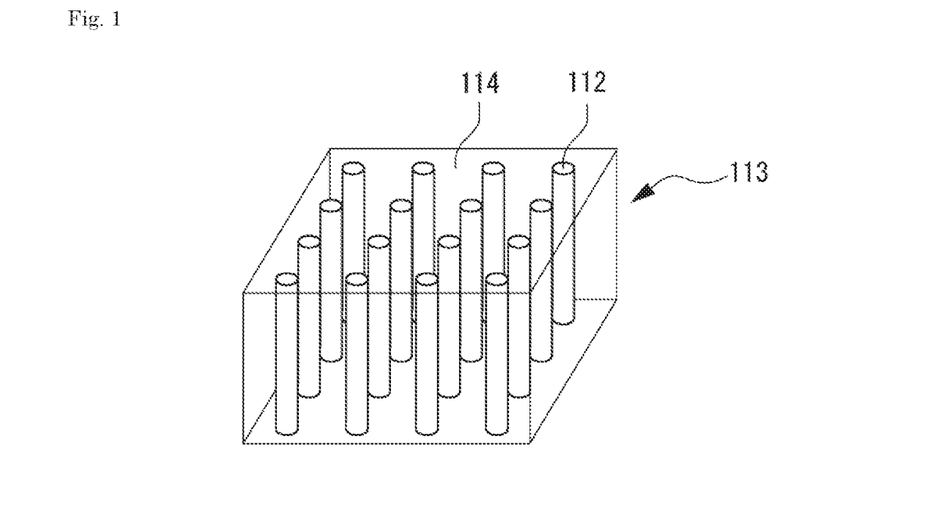
FIG. 1 is a perspective diagram schematically illustrating an example of an internal structure (column structure) of a light diffusion film according to an embodiment of the present invention.

FIG. 1 is a perspective view schematically illustrating the above-described column structure. As illustrated in FIG. 1, the column structure 113 may be a structure in which a plurality of columnar bodies 112 having a relatively high refractive index is densely arranged to stand in the thickness direction and the surroundings thereof are filled with a region 114 having a relatively low refractive index. FIG. 1 depicts the columnar bodies 112 as existing in the entire thickness direction in the column structure 113, but the columnar bodies 112 may not exist at least in one of the upper end part and lower end part of the column structure 113 in the thickness direction.

When light incident on the light diffusion film having such a column structure 113 falls within a predetermined incident angle range, the light exits the light diffusion film while being strongly diffused with a predetermined opening angle. On the other hand, when the incident light falls outside the above incident angle range, the incident light transmits through the light diffusion film without being diffused or exits the light diffusion film with weaker diffusion than that in the case of the incident light within the incident angle range. The diffusion caused by the column structure 113 is different from the diffusion caused by the louver structure and is diffusion that is generally called isotropic diffusion in which the traveling direction of the exiting light is not limited to a predetermined direction.

In the column structure 113, the difference between the refractive index of the columnar bodies 112 having a relatively high refractive index and the refractive index of the region 114 having a relatively low refractive index may be preferably 0.01 or more, particularly preferably 0.05 or more, and further preferably 0.1 or more. When the above difference is 0.01 or more, effective diffusion can be performed. The upper limit of the above difference is not particularly limited and may also be, for example, 0.3 or less.

Preferably, the above-described columnar bodies 112 may have a structure in which the diameter increases from one surface of the light diffusion film to the other surface. The columnar bodies 112 having such a structure may readily change the traveling direction of light parallel to the axial direction of the columnar bodies as compared with columnar bodies in which the diameter does not substantially change from one surface to the other surface. This allows the light diffusion film to effectively diffuse light.

The maximum value of the diameter in the cross sections when the columnar bodies 112 are cut along a horizontal plane with respect to the axial direction may be preferably 0.1 μm or more, particularly preferably 0.5 μm or more, and further preferably 1 μm or more. From another aspect, the maximum value may be preferably 15 μm or less, particularly preferably 10 μm or less, and further preferably 5 μm or less. When the maximum value of the diameter falls within the above range, the light diffusion film can effectively diffuse light. The cross-sectional shape of the columnar bodies 112 when cut along a plane perpendicular to the axial direction is not particularly limited, but may preferably be, for example, a circle, an ellipse, a polygonal shape, an irregular shape, or other similar shape.

In the column structure 113, the distance between adjacent columnar bodies 112 may be preferably 0.1 μm or more, particularly preferably 0.5 μm or more, and further preferably 1 μm or more. From another aspect, the above distance may be preferably 15 μm or less, particularly preferably 10 μm or less, and further preferably 5 μm or less. When the distance between adjacent columnar bodies 112 falls within the above range, the light diffusion film can effectively diffuse light.

In the column structure 113, the columnar bodies 112 may be densely arranged to stand parallel to the film thickness direction of the light diffusion film or may also be densely arranged to stand at a certain tilt angle. The tilt angle when the columnar bodies 112 are densely arranged to stand at a certain tilt angle, that is, an angle on the acute angle side formed by the axis of each columnar body 112 of the column structure 113 and the normal line of the light diffusion film may be preferably 1° or more, particularly preferably 5° or more, and further preferably 10° or more. From another aspect, the above angle may be preferably 50° or less, particularly preferably 40° or less, and further preferably 30° or less. When the columnar bodies 112 are tilted within the above range, the light diffusion film having such a column structure 113 can diffuse the transmitted light while deflecting it in a desired direction.

The dimensions, predetermined angle, and other parameters relating to the internal structure of the column structure 113 described above can be measured by observing the cross section of the column structure 113 using an optical digital microscope.

(2-2) Louver Structure

Figure 2:
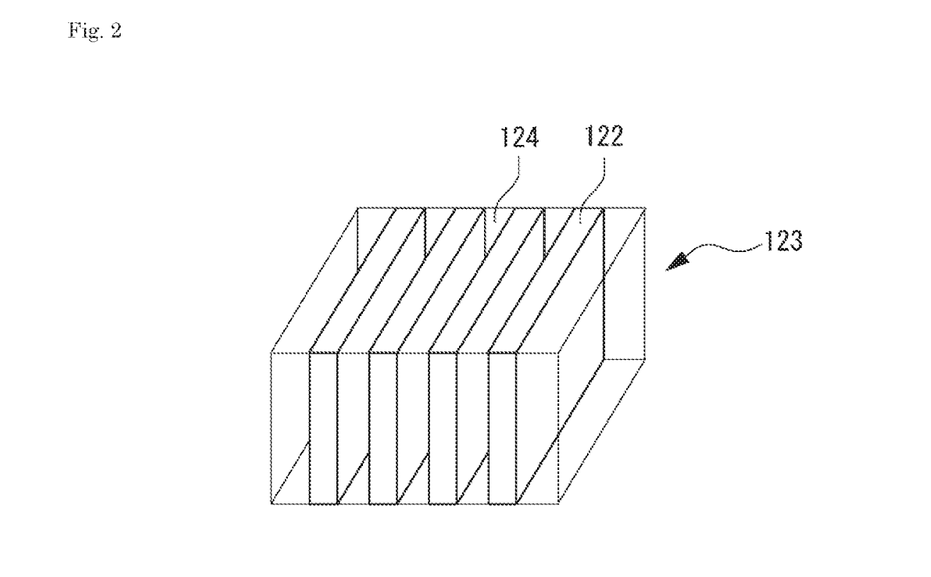
FIG. 2 is a perspective diagram schematically illustrating another example of an internal structure (louver structure) of a light diffusion film according to an embodiment of the present invention.

FIG. 2 is a perspective view schematically illustrating the previously described louver structure. As illustrated in FIG. 2, the louver structure 123 may be a structure in which plate-like regions 122 having a relatively high refractive index are alternately arranged in one direction along the film surface and spaces therebetween are filled with regions 124 having a relatively low refractive index. FIG. 2 depicts the plate-like regions 122 as existing in the entire thickness direction in the louver structure 123, but the plate-like regions 122 may not exist at least in one of the upper end part and lower end part of the louver structure 123 in the thickness direction.

Light incident on the light diffusion film having such a louver structure 123 exits the light diffusion film while being diffused or transmits through the light diffusion film without being diffused depending on the incident angle. The light diffusion film having the louver structure 123 has a property that the diffusion is likely to occur in a direction perpendicular to the arrangement direction of the plate-like regions 122. Such diffusion in which the traveling direction of the exiting light is mainly only in a predetermined direction is generally referred to as anisotropic diffusion.

In the louver structure 123, the difference between the refractive index of the plate-like regions 122 having a relatively high refractive index and the refractive index of the region 124 having a relatively low refractive index may be preferably 0.01 or more. When the above difference is 0.01 or more, the light diffusion film including the louver structure 123 can effectively diffuse light. The upper limit of the above difference is not particularly limited and may also be, for example, 0.3 or less.

In the louver structure 123, the thickness (length in the arrangement direction) of each plate-like region 122 may be preferably 0.1 μm or more, particularly preferably 0.5 μm or more, and further preferably 1.0 μm or more. From another aspect, the above thickness may be preferably 15 μm or less, particularly preferably 10 μm or less, and further preferably 5 μm or less. The space between adjacent plate-like regions 122 may preferably fall within the same range as the above. When the thickness of the plate-like regions 122 and the space between adjacent plate-like regions 122 are each within the above range, the light transmitted through the louver structure 123 can be well changed in its traveling direction, and as a result, the light diffusion film can effectively diffuse light.

In the louver structure 123, the plate-like regions 122 may be tilted along the arrangement direction or may also be arranged with no tilt so as to coincide with the film normal direction. The tilt angle in the case of being tilted along the arrangement direction, that is, an angle on the acute angle side formed by one surface of each plate-like region 122 and the normal line of the light diffusion film may be preferably 1° or more, more preferably 5° or more, particularly preferably 10° or more, and further preferably 20° or more. From another aspect, the above tilt angle may be preferably 80° or less, particularly preferably 60° or less, and further preferably 45° or less. When the plate-like regions 122 are tilted within the above range, the light diffusion film having such a louver structure 123 can diffuse light while deflecting it in a predetermined direction.

The dimensions, predetermined angle, and other parameters relating to the internal structure of the louver structure 123 described above can be measured by observing the cross section of the louver structure 113 using an optical digital microscope.

(2-3) Other Internal Structures

The internal structure of the light diffusion film according to the present embodiment may be a structure other than the above-described column structure 113 and louver structure 123. For example, the light diffusion film may have, as the internal structure, a structure in which the columnar bodies 112 in the above-described column structure 113 are bent at the middle in the thickness direction of the light diffusion film. Alternatively, the light diffusion film according to the present embodiment may have an internal structure in which two or more of the column structure 113, the louver structure 123, and the above-described bent structure are arbitrarily combined and laminated.

3. Method of Manufacturing Light Diffusion Film

The method of manufacturing the light diffusion film according to the present embodiment is not particularly limited, provided that the obtained light diffusion film can achieve the previously described effects. For example, the light diffusion film according to the present embodiment can be manufactured using a conventional method. More specifically, the light diffusion film can be obtained through applying the previously described composition for light diffusion films to one surface of a process sheet to form a coating film and then irradiating the coating film with active energy rays to cure the coating film.

Any of a plastic film and paper can be used as the above process sheet. Examples of the plastic film include polyester-based films such as a polyethylene terephthalate film, polyolefin-based films such as a polyethylene film and a polypropylene film, cellulose-based films such as a triacetyl cellulose film, and polyimide-based films. Examples of the paper include glassine paper, coated paper, and laminated paper. Preferably, the process sheet may be a plastic film that is excellent in the dimensional stability against heat and/or active energy rays. Preferred examples of such a plastic film include polyester-based films, polyolefin-based films, and polyimide-based films among the above.

For the process sheet, it is preferred to provide a release layer on the coating surface side of the process sheet to which the composition for light diffusion films is applied, in order that the cured coating film can readily be released from the process sheet. Such a release layer can be formed using a conventionally known release agent such as a silicone-based release agent, a fluorine-based release agent, an alkyd-based release agent, and an olefin-based release agent.

Examples of the method for the above-described application include a knife coating method, a roll coating method, a bar coating method, a blade coating method, a die coating method, and a gravure coating method. The composition for light diffusion films may be diluted using a solvent as necessary.

Irradiation of the coating film with the active energy rays may be performed in a different mode depending on the internal structure to be formed. For example, when forming the previously described column structure 113, the coating film may be irradiated with parallel light having a high degree of parallelism of light rays. Here, the parallel light means approximately parallel light that does not spread when the direction of emitted light is viewed from any direction. Such parallel light can be prepared using a known means such as a lens or a light shielding member. During the irradiation, it is preferred to irradiate the laminate of the coating film and the process sheet with the above parallel light while moving the laminate in the longitudinal direction using a conveyor or the like. The tilt angle of the columnar bodies 112 formed in the column structure 113 can be adjusted by adjusting the angle of irradiation with the above parallel light.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

When forming the column structure 113 using ultraviolet rays as the active energy rays, it may be preferred to set the irradiation condition such that the peak illuminance on the coating film surface is 0.1 to 10 $mW/cm^2$. The peak illuminance as referred to herein means a measured value at a portion at which the active energy rays irradiating the coating film surface show the maximum value. Additionally or alternatively, it may be preferred to set the integrated light amount on the coating film surface to 5 to 200 $mJ/cm^2$.

When forming the column structure 113 using ultraviolet rays as the active energy rays, the relative moving speed of the light source for the active energy rays with respect to the above laminate may be preferably 0.1 to 10 m/min.

On the other hand, when forming the previously described louver structure 123, a linear light source may be used as the light source for the active energy rays to irradiate the laminate surface with light randomly in the width direction (TD direction) and with approximately parallel strip-shaped (substantially linear) light in the flow direction (MD direction). The tilt angle of the plate-like regions 122 formed in the louver structure 123 can be adjusted by adjusting the angle of irradiation with the above light.

When forming the louver structure 123 using ultraviolet rays as the active energy rays, it may be preferred to set the irradiation condition such that the peak illuminance on the coating film surface is 0.1 to 50 $mW/cm^2$ or less. Additionally or alternatively, it may be preferred to set the integrated light amount on the coating film surface to 5 to 300 $mJ/cm^2$ or less. Additionally or alternatively, the relative moving speed of the light source for the active energy rays with respect to the above laminate may be preferably 0.1 to 10 m/min.

From the viewpoint of completing more reliable curing, it may also be preferred to irradiate the laminate with commonly-used active energy rays (active energy rays for which the process of converting the rays into parallel light or strip-shaped light is not performed, scattered light) after performing the curing using the parallel light or the strip-shaped light as previously described. For this operation, a release sheet may be laminated on the coating film surface from the viewpoint of uniform curing.

4. Use of Light Diffusion Film

The use of the light diffusion film according to the present embodiment is not particularly limited and can be used in the same manner as those for conventional light diffusion films. For example, the light diffusion film according to the present embodiment can be used for manufacturing a liquid crystal display device, an organic light emitting device, electronic paper, or other similar devices.

In the light diffusion film according to the present embodiment, the occurrence of dents when the film is manufactured and the occurrence of collapse when the film is laminated on another member can be well suppressed. Thus, the light diffusion film according to the present embodiment can well exhibit the desired light diffusivity, and the above-described liquid crystal display device or the like manufactured using such a light diffusion film can also well exhibit the desired performance.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described further specifically with reference to examples, etc., but the scope of the present invention is not limited to these examples, etc.

Example 1

1. Preparation of Composition for Light Diffusion Films

Polyether urethane methacrylate having a weight-average molecular weight of 9,900 was obtained as the low refractive index component by reacting polypropylene glycol, isophorone diisocyanate, and 2-hydroxyethyl methacrylate. A composition for light diffusion films was obtained through adding 60 mass parts (solid content equivalent value, here and hereinafter) of o-phenylphenoxyethoxyethyl acrylate having a molecular weight of 268 as the high refractive index component, 5 mass parts (5 mass parts with respect to 100 mass parts of the total amount of the high refractive index component and the low refractive index component) of dipentaerythritol hexaacrylate as the polyfunctional monomer, and 8 mass parts of 2-hydroxy-2-methyl-1-phenylpropan-1-one as the photopolymerization initiator to 40 mass parts of the above low refractive index component and then heating and mixing them under a condition of 80° C.

The refractive indices of the above high refractive index component and the above low refractive index component were measured in accordance with JIS K0062-1992 using an Abbe refractometer (available from ATAGO CO., LTD., product name "Abbe Refractometer DR-M2," Na light source, wavelength 589 nm) and determined as 1.58 and 1.46, respectively.

2. Formation of Light Diffusion Film

The obtained composition for light diffusion films was applied to one surface of a long polyethylene terephthalate sheet as the process sheet to form a coating film. A laminate composed of the coating film and the process sheet was thus obtained.

Subsequently, the obtained laminate was placed on a conveyor. At that time, the surface of the laminate on the coating film side was on the upper side, and the longitudinal direction of the process sheet was made parallel to the flow direction of the conveyor. Then, an ultraviolet spot parallel light source (available from JATEC) having a controlled center beam parallelism within ±3° was installed on the conveyor on which the laminate was placed. At that time, the light source was installed so as to be able to emit parallel light in a direction tilted by 15° on the opposite side to the flow direction of the conveyor with respect to the normal direction of the surface of the laminate on the coating film side. The light source was also installed so that the distance between the surface of the above coating film and the above light source would be 240 mm.

Thereafter, while the conveyor was operated to move the laminate at a speed of 0.2 m/min, the coating film of the laminate was cured by being irradiated with parallel light having a parallelism of 2° or less (UV light from a high-pressure mercury lamp having a main peak at a wavelength of 365 nm and other peaks at 254 nm, 303 nm, and 313 nm) under the conditions of a peak illuminance of 2.00 mW/cm$^2$ and an integrated light amount of 53.13 mJ/cm$^2$ on the coating film surface (this curing may be referred to as "primary curing" for convenience).

Subsequently, from the viewpoint of sufficiently curing the above coating film, after a release sheet (available from LINTEC Corporation, product name "SP-PET382050," center line average roughness on the surface on the ultraviolet irradiation side: 0.01 μm, haze value: 1.80%, image clarity: 425, transmittance at a wavelength of 360 nm: 84.3%) was laminated on the surface of the laminate on the coating film side, the coating film of the laminate was cured by being irradiated through the release sheet with ultra violet rays (scattered light) under the conditions of a peak illuminance of 10 mW/cm$^2$ and an integrated light amount of 150 mJ/cm$^2$ (this curing may be referred to as "secondary curing" for convenience). The above-described peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the coating film.

Through the above primary curing and secondary curing for curing the above-described coating film, a light diffusion film having a thickness of 75 μm was obtained in a state of being laminated between the release sheet and the process sheet. The thickness of the light diffusion film was measured using a constant-pressure thickness meter (available from TECLOCK, product name "PG-02J").

When the cross section of the formed light diffusion film was observed with a microscope, it was confirmed that a column structure in which a plurality of columnar bodies was densely arranged to stand in the thickness direction was formed in the light diffusion film. In particular, it was confirmed that the columnar bodies were tilted by 20° (tilt angle of −20°) on the opposite side to the traveling direction of the conveyor with respect to the thickness direction of the light diffusion film. Provided that the normal direction of the film surface is 0°, the tilt angle in the conveyor traveling direction is indicated as a positive value, and the tilt angle in the opposite direction is indicated as a negative value.

Examples 2 and 3

Light diffusion films were manufactured in the same manner as in Example 1 except that the type and thickness of the polyfunctional monomer were as listed in Table 1.

Comparative Example 1

A light diffusion film was manufactured in the same manner as in Example 1 except that no multifunctional monomer was used.

Testing Example 1

Measurement of Indentation Elastic Modulus

For one of the surfaces exposed by removing the process sheet and the release film from the light diffusion film manufactured in each of the examples and comparative example, the indentation elastic modulus (MPa) at 23° C. was measured using an ultra micro hardness tester (available from SHIMADZU CORPORATION, "Shimadzu Dynamic Ultra Micro Hardness Tester DUH-W201S"). The results are listed in Table 1.

Testing Example 2

Measurement of Tensile Elastic Modulus

After removing the process sheet and the release film from the light diffusion film manufactured in each of the examples and comparative example, the light diffusion film was cut into a size of 15 mm×140 mm to obtain a test piece of the light diffusion film. For the test piece, the tensile elasticity modulus at 23° C. was measured in accordance with JIS K7127: 1999. Specifically, after setting the test piece to a tensile tester (available from SHIMADZU CORPORATION, product name "Autograph AG-IS 500N") with a distance between chucks of 100 mm, the tensile test was performed at a speed of 200 mm/min to measure the tensile elastic modulus (MPa). The results are listed in Table 1.

Testing Example 3

Evaluation of Dent Suppression

The process sheet was removed from the light diffusion film manufactured in each of the examples and comparative example. The laminate thus obtained and composed of the light diffusion film and the release film was placed on a hard support table with the surface on the release film side facing up. Then, a point load was applied to the light diffusion film via the release film to make a dent. Specifically, a load of 225 g was applied for 10 seconds using a hardness meter (available from KOBUNSHI KEIKI CO., LTD., product name "Asker Hardness Meter C2") with a probe tip of a hemisphere having a diameter of 2.54 mm.

After 5 minutes elapsed from the application of the above point load, the release film was removed from the light diffusion film to expose the surface of the light diffusion film, and the depth of the dent remaining on the exposed surface was measured with an optical interference microscope (available from Veeco Instruments Inc., product name "Surface Profiler WYKO NT110"). Then, dent suppression was evaluated based on the following criteria. The results are listed in Table 1.

A . . . The depth of the remaining dent was 0 nm or more and 10 nm or less.

B . . . The depth of the remaining dent was more than 10 nm and 20 nm or less.

C . . . The depth of the remaining dent was more than 20 nm.

In addition, the load when applying the point load was changed to 443 g and the same measurement as the above was performed to evaluate the dent suppression. The results are also listed in Table 1.

Testing Example 4

Variable Haze Measurement

For the light diffusion film manufactured in each of the examples and comparative example, the haze value (%) was measured using a variable haze meter (available from Toyo Seiki Seisaku-sho, Ltd., product name "Haze-Gard-Plus, Variable Haze Meter"). Specifically, after removing the process sheet and the release film from the light diffusion film, one surface of the light diffusion film was irradiated with light rays while varying the incident angle with respect to the normal line of the surface within a range of −50° to 10° along the longitudinal direction of the light diffusion film, and the haze value (%) was measured sequentially.

Subsequently, for the results of the sequential measurement, the incident angle range in which the haze value was 90% or more was specified in the incident angle measurement range (−50° to 10°), and a difference between two angles at the end points of the range was calculated and determined as the angle range (variable haze angle range) giving a haze value of 90% or more. The results are listed in Table 1.

TABLE 1

|  | Type of polyfunctional monomer | Thickness (μm) | Indentation elastic modulus (MPa) | Tensile elastic modulus (MPa) | Evaluation of dent suppression | | Variable haze angle range |
|---|---|---|---|---|---|---|---|
|  |  |  |  |  | 225 g load | 443 g load |  |
| Example 1 | Dipentaerythritol hexaacrylate | 75 | 148 | 11 | A | A | 40 |
| Example 2 | Trimethylolpropane triacrylate | 165 | 164 | 31 | A | A | 47 or more |
| Example 3 | Pentaerythritol tetraacrylate | 165 | 42 | 35 | A | B | 47 or more |
| Comparative Example 1 | — | 75 | 27 | 10 | C | C | 38 |

As listed in Table 1, according to the light diffusion films of the examples, the occurrence of dents was able to be well suppressed.

INDUSTRIAL APPLICABILITY

The light diffusion film of the present invention may be suitably used for manufacturing of a liquid crystal display device or the like.

DESCRIPTION OF REFERENCE NUMERALS

112 . . . Columnar bodies having a relatively high refractive index
113 . . . Column structure
114 . . . Region having a relatively low refractive index
122 . . . Plate-like regions having a relatively high refractive index
123 . . . Louvre structure
124 . . . Regions having a relatively low refractive index

The invention claimed is:

1. A light diffusion film comprising:
an internal structure in the film, the internal structure comprising a plurality of regions having a relatively high refractive index in a region having a relatively low refractive index,
the light diffusion film having an indentation elastic modulus of 30 MPa or more at 23° C. throughout an entirety of the light diffusion film,
wherein the indentation elastic modulus of 30 MPa or more at 23° C. is measured with an ultra micro hardness tester.

2. The light diffusion film according to claim 1, having an indentation elastic modulus of 500 MPa or less at 23° C.

3. The light diffusion film according to claim 1, having a tensile elastic modulus of 1 MPa or more and 500 MPa or less at 23° C.

4. The light diffusion film according to claim 1, wherein the internal structure in the light diffusion film is an internal structure in which the plurality of regions having the relatively high refractive index extends with a predetermined length in a film thickness direction in the region having the relatively low refractive index.

5. The light diffusion film according to claim 1, wherein the plurality of regions having the relatively high refractive index include one or two polymerizable functional groups, and the region having the relatively low refractive index includes one or two polymerizable functional groups.

6. The light diffusion film according to claim 1, wherein the internal structure includes a polyfunctional monomer having 3 or more polymerizable functional groups.

\* \* \* \* \*